(12) United States Patent
Hammond

(10) Patent No.: US 6,550,060 B1
(45) Date of Patent: Apr. 15, 2003

(54) METHOD AND SYSTEM FOR DYNAMIC INJECTION OF DYNAMIC LINK LIBRARIES INTO A WINDOWED OPERATING SYSTEM

(75) Inventor: Richard P. Hammond, Simsbury Lane, CT (US)

(73) Assignee: Novadigm, Inc., Mahwah, NJ (US)

( * ) Notice: Subject to any disclaimer, the term of this patent is extended or adjusted under 35 U.S.C. 154(b) by 0 days.

(21) Appl. No.: 09/289,149

(22) Filed: Apr. 8, 1999

(51) Int. Cl.⁷ .................................................. G06I 9/45
(52) U.S. Cl. ...................................... 717/162; 709/331
(58) Field of Search ....................... 717/4, 11, 140–141, 717/124, 162; 395/798; 709/331

(56) References Cited

U.S. PATENT DOCUMENTS

| | | | |
|---|---|---|---|
| 5,583,761 A | * 12/1996 | Chou | 395/798 |
| 5,673,315 A | 9/1997 | Wolf | 380/4 |
| 5,812,848 A | 9/1998 | Cohen | 395/685 |
| 5,958,010 A | 9/1999 | Agarwal et al. | |
| 6,141,698 A | * 10/2000 | Krishnan et al. | 709/331 |
| 6,202,199 B1 | * 3/2001 | Wygodny et al. | 717/4 |
| 6,463,583 B1 | * 10/2002 | Hammond | 717/162 |

FOREIGN PATENT DOCUMENTS

| | | |
|---|---|---|
| EP | 0752647 | 1/1997 |
| WO | 9833106 | 7/1998 |

OTHER PUBLICATIONS

Jeffrey Richter, "Breaking Through Process Boundary Walls", *Advanced Windows*, 3$^{rd}$ Ed., Microsoft Press, Redmond, WA., pp. 899–969 (1997).

Hunt, G., et al., "Detours: Binary Interception of Win32 Functions," Technical Report MSR–TR–98–33, Microsoft Research, Microsoft Corporation, One Microsoft Way, Redmond, WA 98052, http://ftp.research.microsoft.com/pub/tr/tr–98–33.pdf, pp. 1–9.

"DLLaGator Version 2.0 General Availability," Chicago–Soft, Hanover, NH, Apr. 6, 1998, http://www.chicagosoft.com/htm/in_the_lab_DLLagator_availability.html, pp. 1–3.

Kaspersky, E.V., "Win95.K32," Central Command Inc., 1998, http://www.avpve.com/viruses/win95/k32.html, p. 1.

Livingston, B., "Window Manager. Applications can help you get out of life in DLL hell," Infoworld, Infoworld Media Group Inc., Feb. 16, 1998, vol. 20, Issue 7, http://archive.infoworld.com/cgi–bin/displayArchive.pl?/98/07/o02–07.38.htm, pp. 1–3.

"Method for Dynamically Loading Microprocessor Specific Library Functions," IBM Technical Disclosure Bulletin, IBM Corporation, New York, Jun. 1, 1997, vol. 40, No. 6, pp. 77–79.

* cited by examiner

*Primary Examiner*—Tuan Q. Dam
*Assistant Examiner*—Chuck Kendall
(74) *Attorney, Agent, or Firm*—Morrison & Foerster LLP

(57) ABSTRACT

Methods and system for dynamically injecting dynamic link libraries into a process in a windowed operating system. The methods includes determining which dynamic link libraries should be injected into a process on a windowed operating system. The methods and system may allow specific dynamic link libraries to be loaded into specific address spaces for every process created in a windowed operating system such a Microsoft Windows 95/98/NT. The dynamic link libraries are loaded prior to the execution of any application related code in a process address space created by a windowed operating system. The methods and system solve many of the problems associated with injecting dynamic link libraries into an address space created for a process by a windowed operating system.

20 Claims, 6 Drawing Sheets

METHOD AND SYSTEM FOR DYNAMIC INJECTION OF DYNAMIC LINK LIBRARIES INTO A WINDOWED OPERATING SYSTEM

FIELD OF INVENTION

This invention relates to computer operating systems. More specifically, it relates to a method and system for dynamic injection of dynamic link libraries into processes in a windowed operating system.

BACKGROUND OF THE INVENTION

Software applications, such as 32-bit applications (e.g., Win32) for windowed operating systems, such as Windows 95/98, by Microsoft Corporation of Redmond, Washington, execute as separate processes that execute within their own address space. The Windows 95/98/NT operation systems limit code that can execute within an address space to the code associated with a main executable module (e.g., ".EXE") and Dynamic Link Library ("DLL") modules loaded by a process associated with the main executable module. As is known in the art, a Dynamic Link Library provides a mechanism for linking applications to libraries of functions at run-time.

However, there are many situations where additional functionality needs to be added to a process by injecting execution logic into an address space. In particular, there are situations where it is desirable to inject execution logic into new address spaces that will execute before any application-related code executes. For example, applications to monitor or alter the execution of other applications need such additional functionality.

There are a number of techniques known in the art to inject execution logic into an existing windowed operating system's process. However, these techniques have a number of associated problems. Three of these injection techniques include Dynamic Link Library injection, code patching, and remote threads. The Dynamic Link Library injection technique involves loading a Windows 95/98/NT Dynamic Link Library into an address space and placing injection code within a "DllMain" function. A Dynamic Link Library's DllMain function is called by the Windows 95/98/NT operating system when a process loads or unloads a Dynamic Link Library as well as when a new operating system thread is started or stopped within a process. Thus, loading a Dynamic Link Library into an address space will result in the injected code's execution within an address space. However, the injected code will only be executed after the process begins executing.

As is known in the art, there are two ways to inject a Dynamic Link Library into a Windows 95/98 address space including using an operating system registry key "AppInit_DLLs" or calling a "SetWindowsHookEx" API function. As is known in the art, an operating system registry stores hardware, software and user configuration settings for particular a computer.

The AppInit_DLLs registry value can be used with Windows NT but is not implemented by Windows 95/98. A data value for the AppInit_DLLs registry value can contain a list of Dynamic Link Library module file names. When the Windows NT operating system module User Dynamic Link Library (e.g., USER32.DLL) is loaded into an address space, the user Dynamic Link Library will attempt to load the modules listed in this registry setting into a process address space. Use of the AppInit_DLLs registry value will only inject a Dynamic Link Library in a process that executes code within a user's Dynamic Link Library (e.g., USER32.DLL).

However, both Windows 95/98 and Windows NT implement a SetWindowsHookEx Application Programmer's Interface ("API") function. This function is used to hook events within a primary operating system thread or for other operating system threads. When SetWindowsHookEx events occur, a callback function within a Dynamic Link Library is called by the Windows 95/98/NT operating system. If the hooked thread belongs to a different process than the calling thread, Windows 95/98/NT loads the required Dynamic Link Library into the hooked operating system thread's address space. This Dynamic Link Library injection will only be invoked after an application associated with a process has started executing.

Code patching techniques known in the art require an injecting process having access to a target process. First the injected code is copied to a memory area in the target process address space. Next the target process is altered so that the injected logic will be executed. Finally, code within an existing execution thread is altered to execute the injected code. This is typically accomplished by calling injected code within an existing process execution path. Code patching is designed to work only on specific processes modified by a user.

The remote thread technique also requires an injecting process having access to a target thread. The injected code is copied to a memory area in the target thread address space. Then a new thread is started for the target process. This new thread executes the injected code. The remote thread technique also works only on specific processes modified by a user.

These injection techniques do not provide the ability for injected code to be the first non-operating system code to execute in new address space for a new process created by a windowed operating system. In addition these injection techniques are designed to work on specific processes modified by a user and do not allow injection techniques that are generally applicable to any process created by a windowed operating system.

In addition, while the injection techniques described above will inject a dynamic link library into an address space there are still a number of problems associated with the injection techniques. One problem is that these techniques do not work under Windows 95/98 and Windows NT. Another problem is that these techniques do not work without debugging functions. A process can only be "debugged" by one other process. Using the debugging functions to inject a module prevents a debugging application from being able to work properly.

Another problem is that these techniques do not work with minimal overhead. Injection logic should not force unnecessary overhead such as processing unneeded hook or debugging events. Another problem is that these techniques are not the first non-operating system code to execute within an address space. These techniques allow some application specific code to execute before logic within the injected dynamic link library is invoked. Another problem is that these techniques cannot be used to load injection logic into every new address space created for a process or to load different dynamic link libraries into different address spaces.

Another problem is that these techniques do not have the ability not to load a dynamic link library into an address space if is not needed or prevent loading undesirable dynamic link libraries.

Another problem is that these techniques do not have the ability to log dynamic link libraries that were injected into an address space or to inject the same dynamic link libraries into every new process as were injected into a process that creates a new process. This is called "cascade loading."

SUMMARY OF THE INVENTION

In accordance with preferred embodiments of the present invention, some of the problems associated with injecting dynamic link libraries in a windowed operating system are overcome. Methods and system for dynamically injecting dynamic link libraries into a process in a windowed operating system is provided.

One aspect of the present invention includes a method for dynamically injecting dynamic link libraries into a process on a windowed operating system. The method includes executing injection logic from a process on the windowed operating system. The injection logic was injected into the process with an injection dynamic link library. An injection driver loaded by the injection application is queried from the injection logic. A test is conducted to determine from the injection driver whether any dynamic link libraries should be injected into a memory space created by the windowed operating system for the process. If any dynamic link libraries should be injected into the memory space for the process, an injection dynamic link library is loaded to inject the dynamic link libraries into the memory space for the process on the windowed operating system.

Another aspect of the present invention includes a method for determining which dynamic link libraries should be injected into a process on a windowed operating system. Another aspect of the invention includes a method for dynamically selecting dynamic link libraries. Another aspect of the invention includes a dynamic link library injection system comprising an injection driver and an injection dynamic link library.

The methods and system of preferred embodiments of the present invention may allow specific dynamic link libraries to be loaded into specific address spaces for processes created in windowed operating systems. The dynamic link libraries are loaded prior to the execution of any application related code in a process address space created by a windowed operating system.

The foregoing and other features and advantages of an illustrative embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Computing System

Figure 1:
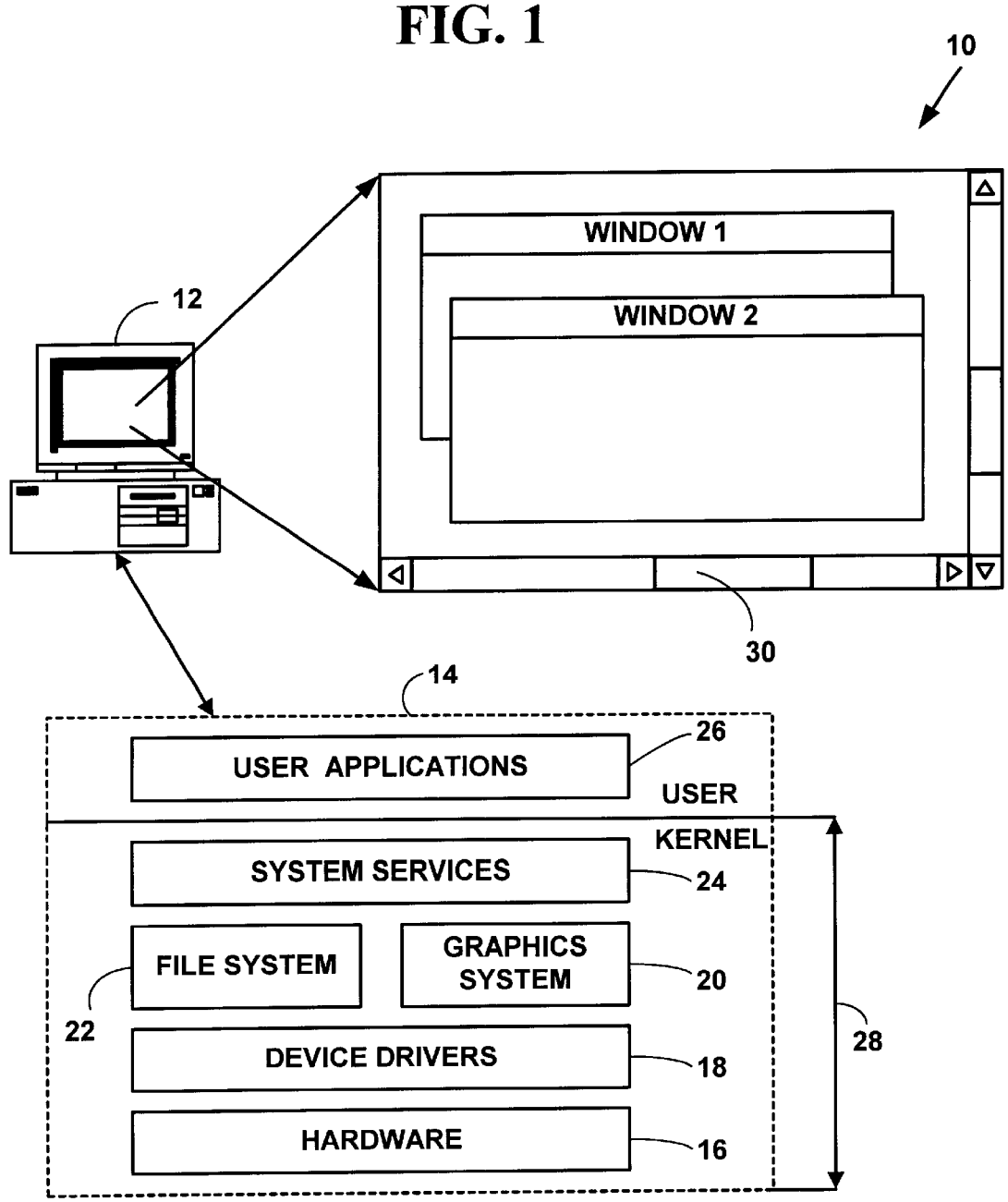
FIG. 1 is a block diagram illustrating an exemplary computing system.

FIG. 1 is a block diagram illustrating an exemplary computing system 10 for a preferred embodiment of the present invention. The computing system 10 includes a computer 12 with a generic windowed operating system 14. The generic windowed operating system 14 generally includes a hardware layer 16, a device driver layer 18, a file system layer 20, a graphics system layer 22, a system services layer 24 and a user applications layer 26. The hardware layer 16, device driver layer 18, file system layer 20, graphics system layer 22, and system services layer 24 comprise an operating system kernel 28. The generic windowed operating system 14 provides a Graphical User Interface ("GUI") 30 with multiple windows. However, more or fewer windowed operating system components could also be used and the present invention is not limited to the generic windowed operating system components illustrated in FIG. 1.

The hardware layer 16 is the actual hardware on the computer 12 such as monitor, keyboard, disk drive, etc. The device driver layers 18 is used to interact with actual hardware in the hardware layer 16. The file system layer 20 is used to create, save, retrieve and delete files. The graphic system layer 22 is used to create the GUI 30 with the multiple windows. The system services layer 24 is used to provide windowed operating system services. The user application layer 26 is used to provide user applications that interact with the windowed operating system kernel 28.

An operating environment for the computing system 10 for preferred embodiments of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Injecting Injection Logic for Using Dynamic Link Libraries into a Windowed Operating System As is known in the art, a Dynamic Link Library ("DLL") provides a mechanism for linking applications to libraries of functions at run time. These libraries are "dynamically linked" because they are linked to an application when it is loaded and executed rather than when it is linked. When an application uses a DLL, the operating system loads the DLL into memory, resolves references to functions in the DLL so that they can be called by the application, and unloads the DLL when it is no longer needed. Loading a DLL into an address space results in execution of code within a DLL.

Dynamic linking can be performed explicitly by applications or implicitly by the operating system. DLLs are designed to provide resources to applications. DLLs most often appear as files with a ".DLL" filename extension; however, they may also have an executable (".EXE') or other filename extension.

Figure 2:
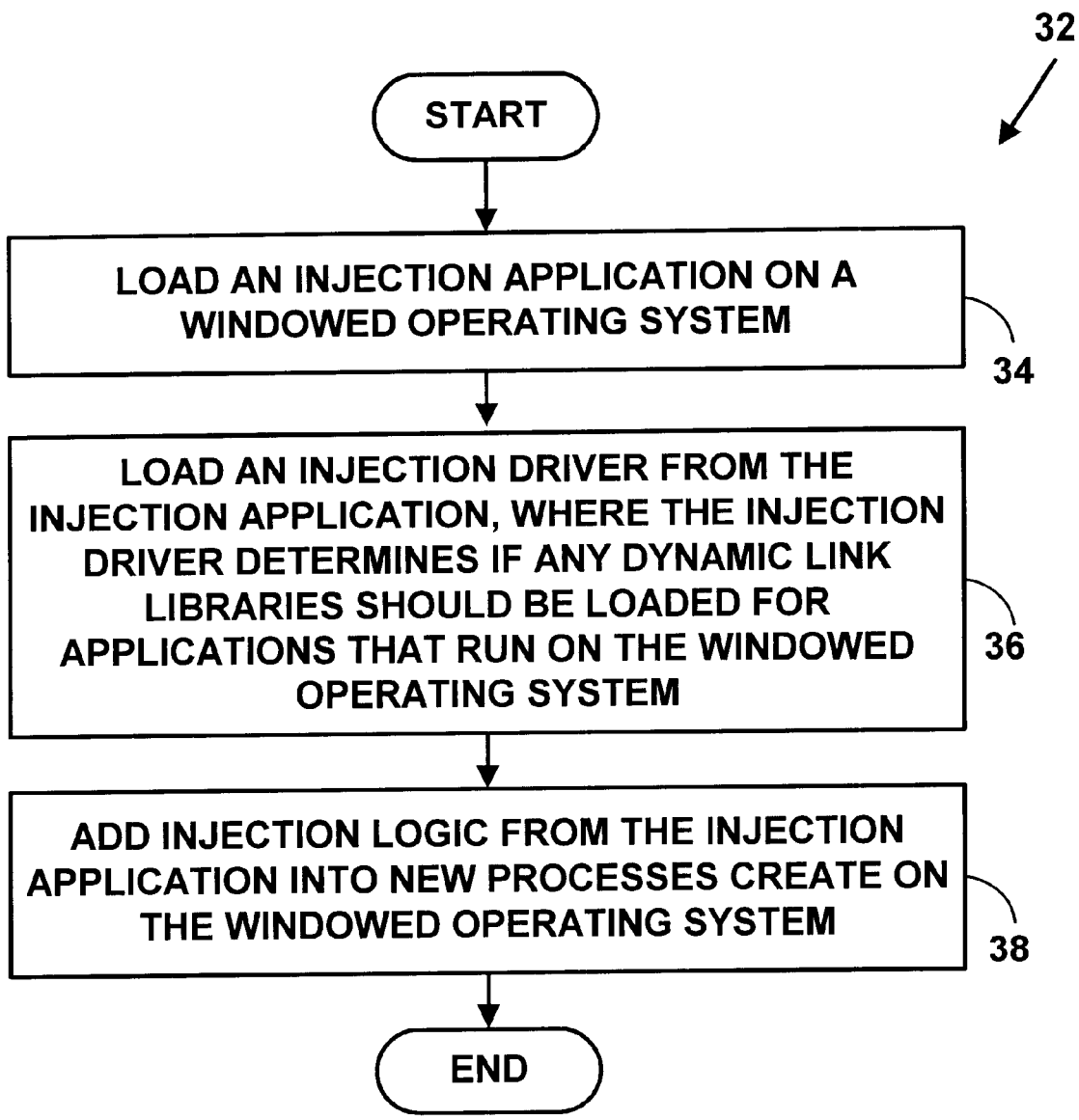
FIG. 2 is a flow diagram illustrating a method for dynamically injecting injection logic into a windowed operating system.

FIG. 2 is a flow diagram illustrating a Method 32 for dynamically injecting injection logic into a windowed operating system. At Step 34, an injection application is loaded on a windowed operating system. The injection application is used to inject injection logic into processes that run on a windowed operating system. The injection logic is executed prior to any application related logic in a process address space created by the windowed operating system. At Step 36, an injection driver is loaded from the injection application. The injection driver includes logic to determine if any dynamic link libraries should be loaded for application related logic associated with a process on the windowed operating system. At Step 38, injection logic is injected into new processes created on the windowed operating system. The injection logic queries the injection driver to determine if any dynamic link libraries should be injected into the new process.

In exemplary preferred embodiments of the present invention, the windowed operating system is any of Windows 95, Windows 98, or Windows NT by Microsoft Corporation of Redmond, Wash. However, the present invention is not limited to windowed operating systems by Microsoft, and other windowed operating systems could also be used.

In one exemplary preferred embodiment of the present invention, at step 34 the injection application is an application used on a windowed operating system that uses shared memory for processes (e.g., Windows 95/98). In another exemplary preferred embodiment of the present invention, the injection application at step 34 is an injection service used on a windowed operating system that does not use shared memory for processes (e.g., Windows NT).

In preferred embodiments of the present invention at Step 38, injection logic is injected into new processes created on the windowed operating system. In one preferred embodiment of the present invention, injection logic is injected into new processes in a windowed operating system that uses shared memory for processes (e.g., Windows 95/98). Techniques for injecting injection logic for such an embodiment are disclosed in co-pending application Ser. No. 09/289,150, titled "METHODS AND SYSTEM FOR DYNAMIC INJECTION OF EXECUTION LOGIC INTO A SHARED MEMORY SPACE OF A WINDOWED OPERATING SYSTEM", filed on Apr. 8, 1999, now U.S. Pat. No. 6,463,583, incorporated herein by reference.

In another preferred embodiment of the present invention, injection logic is injected into existing and new processes in a windowed operating system that does not use shared memory for processes (e.g., Windows NT). Techniques for injecting injection logic for such an embodiment are disclosed in co-pending application Ser. No. 09/285,195, titled "METHOD AND SYSTEM FOR DYNAMIC INJECTION OF EXECUTION LOGIC INTO A WINDOWED OPERATING SYSTEM", filed on Apr. 8, 1999, incorporated herein by reference.

However, other injection techniques could also be used, and the present invetnion is not limited to the injection techniques described in the co-pending applications. In addition, the present invention is not limited to windowed operating systems from Microsoft.

Dynamically Injecting Dynamic Link Libraries into a Windowed Operating System

Figure 3:
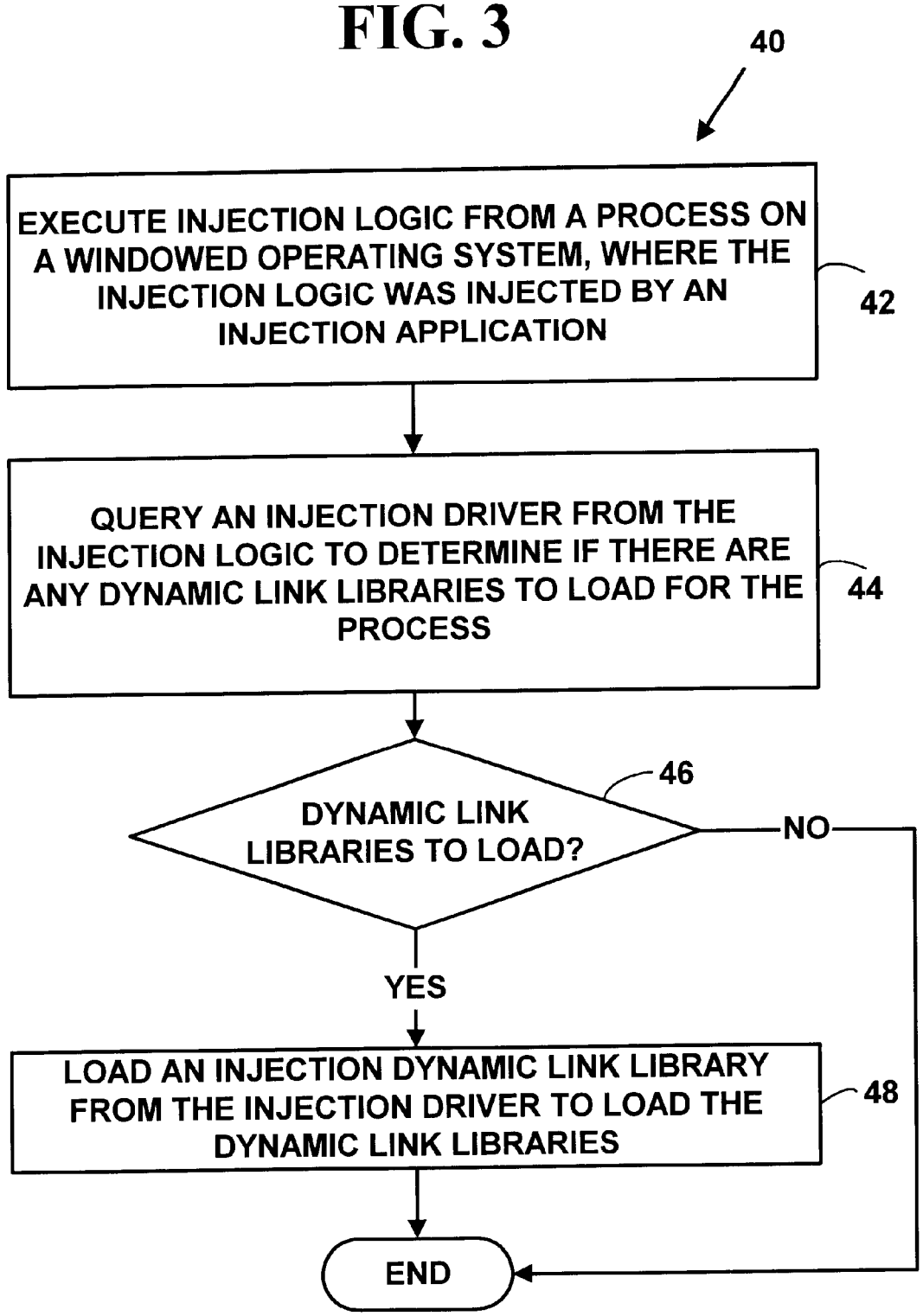
FIG. 3 is a flow diagram illustrating a method for dynamically injecting dynamic link libraries into a process on a windowed operating system.

FIG. 3 is a flow diagram illustrating a Method 40 for dynamically injecting dynamic link libraries into a process on a windowed operating system. At Step 42, injection logic from a process on the windowed operating system is executed. The injection logic was injected into the process with an injection application (e.g., at step 38 of Method 32). At Step 44, an injection driver loaded by the injection application is queried from the injection logic. At Step 46, a test is conducted to determine from the injection driver whether any dynamic link libraries should be injected into a memory space created by the windowed operating system for the process. If any dynamic link libraries should be injected into the memory space for the process, then at Step 48 an injection dynamic link library is loaded to inject the dynamic link libraries into the memory space for the process on the windowed operating system.

The injection dynamic link library includes multiple injection functions for executing injection logic for modifying a main kernel dynamic link library function (e.g., DllMain or RtlImageDirectoryEntryToData) in an original kernel dynamic link library (e.g., KERNEL32.DLL or NTDLL.DLL) to jump to an injection hook function within the injection dynamic link library. The injection functions from the injection dynamic link library are used to execute injection logic prior to executing any other applications related logic in a new process address space created by a windowed operating system. The injection dynamic link library is also used for querying an injection driver from for a list of dynamic link libraries that should be injected into a process on a windowed operating system.

In one exemplary preferred embodiment of the present invention, at Step 42, injection logic from a process on Windows 95/98/NT is executed. The injection logic was injected into the process with Method 32 (FIG. 2). At Step 44, an injection driver loaded by the injection application is queried from the injection logic. The injection driver determines which DLLs to load for a process based on a process's executable module (".EXE") file name, version, Cyclic Redundancy Code ("CRC") or other qualifiers. The injection driver can be statically configured using data files and an operating system registry. As is known in the art, an operating system registry is a hierarchical database that stores hardware, software and user configuration settings for a computer. The injection driver can also be dynamically configured by calling configuration functions within the injection driver.

At Step 46, a test is conducted to determine from the injection driver whether any DLL should be injected into the memory space for the process on Windows 95/98/NT. If any DLLs should be injected into the memory space for the process, then at Step 48 an injection dynamic link library called INJECT.DLL is loaded by the injection driver to inject the DLLs into the memory space for the process on Windows 95/98/NT.

Figure 4:
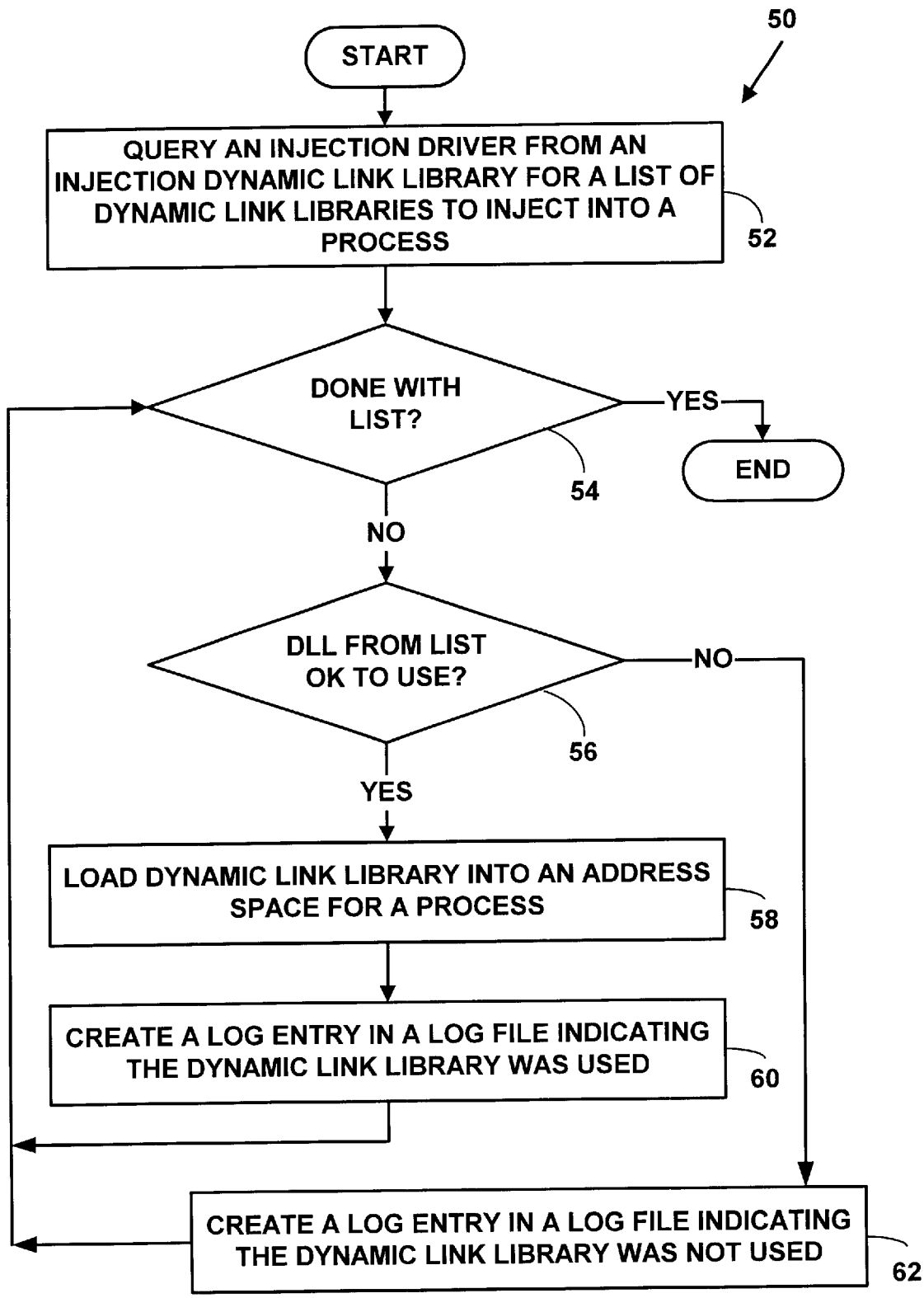
FIG. 4 is a flow diagram illustrating a method for determining which dynamic link libraries should be injected into a process on a windowed operating system.

FIG. 4 is a flow diagram illustrating a Method 50 for determining which dynamic link libraries should be injected into a process on a windowed operating system. At Step 52, an injection driver is queried from an injection dynamic link library for a list of dynamic link libraries that should be injected into a process on a windowed operating system. At Step 54, a loop is entered to repeat steps 56, 58, 60 and 62 from the injection dynamic link library using the list of dynamic link libraries obtained from the injection driver. At Step 56, a test is conducted to determine if a dynamic link library from the list is appropriate to load into the memory space for the process created by the windowed operating system. If the dynamic link library is appropriate to load into the memory space for the process, at Step 58 the dynamic link library is loaded into the memory space for the process. At Step 60, a log entry is created in an injection log for the dynamic link library. If the dynamic link library is not appropriate to load into a memory space for the process, at Step 62, a log entry is created in the injection log indicating the dynamic link library was not appropriate to inject into the memory space for the process.

In one exemplary preferred embodiment of the present invention, at Step 52, an injection driver is queried from the INJECT.DLL for a list of DLLs that should be injected into a process on Windows 95/98/NT. At Step 54, a loop is entered using the list of DLLs obtained from the injection driver. At Step 56, a test is conducted to determine if a DLL from the list is appropriate to load into a memory space for the process created by Windows 95/98/NT. The INJECT-.DLL examines a DLL's location, internal functions, size, and other characteristics to determine if the DLL is appropriate to load into a memory space for the process.

If the DLL is appropriate to load into a memory space for the process, at Step 58 the DLL is loaded into a memory space for the process. The INJECT.DLL issues a Windows LoadLibrary function call. As is known in the art, the LoadLibrary function call is used to load a DLL from the Windows operating system.

At Step 60, a log entry is created in an injection log for the DLL that was loaded into memory space for the process. The log entry includes a name of a DLL loaded, a location, a timestamp, and other information about the DLL. If the DLL is not appropriate to load into a memory space for the process, at Step 62, a log entry is created in the injection log indicating the DLL was not appropriate to inject into the memory space for the process. This log entry includes a name of a DLL not loaded, a location, a timestamp and a reason for not using the DLL.

Dynamically Injecting Dynamic Link Libraries Using Injection Criteria

Functions in the injection driver can be called to send injection criteria associated with an injecting a dynamic link library.

Figure 5:
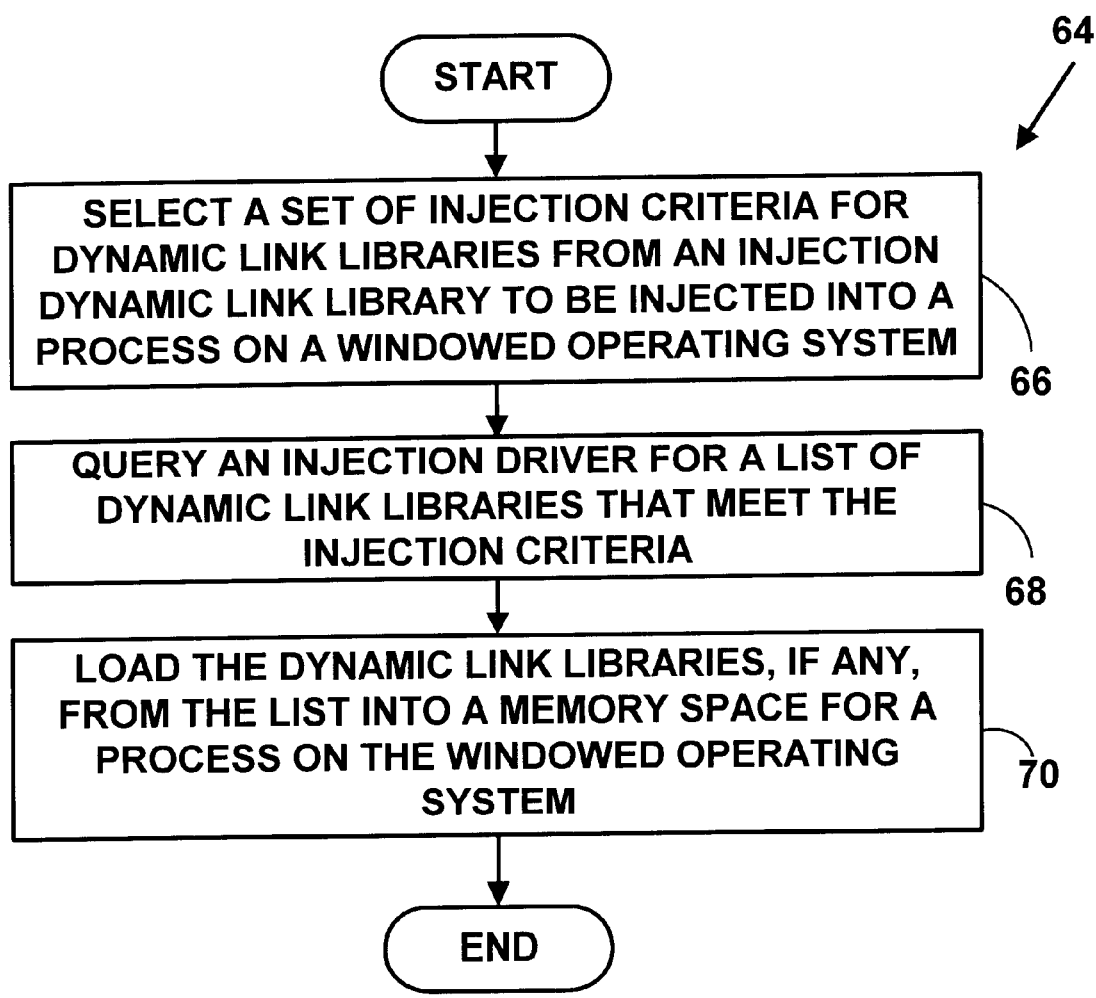
FIG. 5 is a flow diagram illustrating a method for dynamically selecting dynamic link libraries using injection criteria.

FIG. 5 is a flow diagram illustrating a Method 64 for dynamically selecting dynamic link libraries using injection criteria. At Step 66, a set of injection criteria is selected for dynamic link libraries from an injection dynamic link library that will be injected into a process on a windowed operating system. At Step 68, an injection driver is queried from the injection dynamic link library for a list of dynamic link libraries that meet the set of injection criteria. At Step 70, dynamic link libraries from the list, if any, are loaded into a memory space for the process by the injection dynamic link library.

In one exemplary preferred embodiment of the present invention, at Step 66, a set of injection criteria is selected for DLLs from the INJECT.DLL that will be injected into a process on Windows 95/98/NT. At Step 68, an injection driver is queried from the INJECT.DLL for a list of DLLs that meet the set of injection criteria. At Step 70, DLLs from the list, if any, are loaded into a memory space for the Windows 95/98/NT process by the INJECT.DLL.

In one exemplary preferred embodiment of the present invention, the injection criteria can includes "cascade loading." As is known in the art, injecting the same dynamic link libraries into every new process as were injected into a process that creates a new process is called "cascade loading."

Exemplary System for Dynamically Injecting Dynamic Link Libraries

Figure 6:
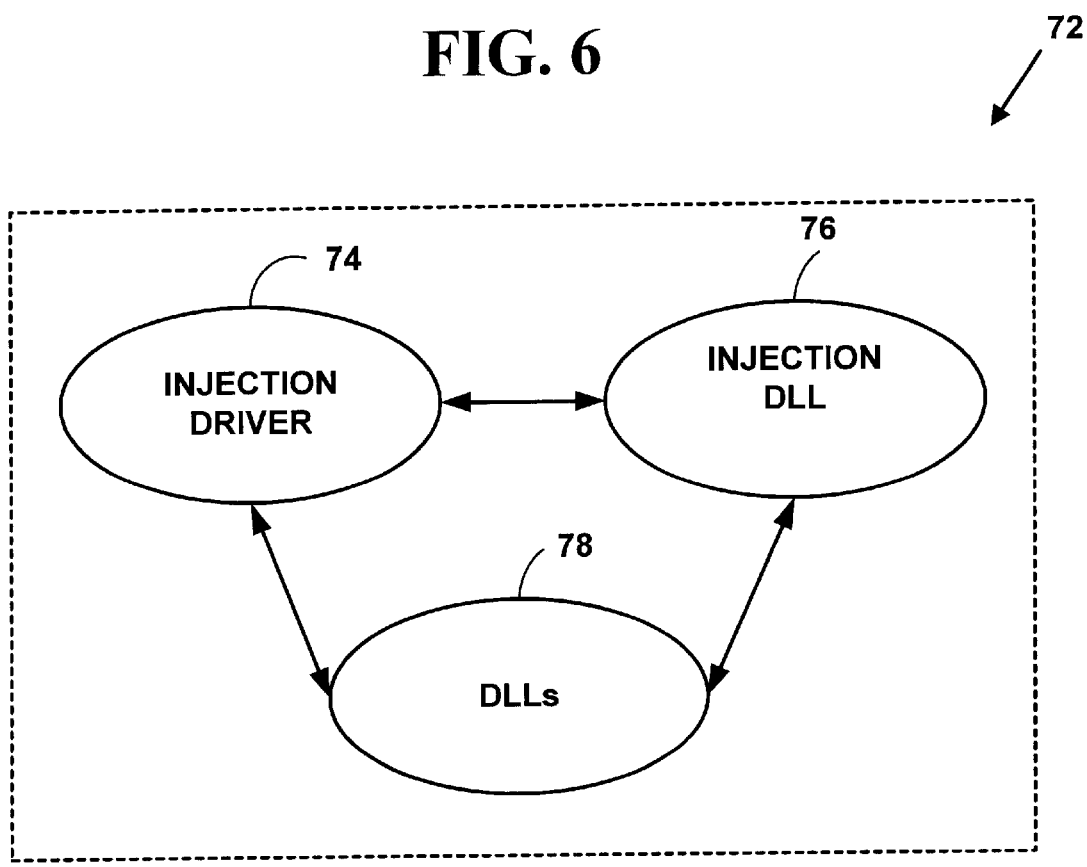
FIG. 6 is a block diagram illustrating a system for dynamically injecting dynamic link libraries.

FIG. 6 is a block diagram illustrating a system 72 for dynamically injecting dynamic link libraries. The system 72 includes an injection driver 74 and an injection dynamic link library 76. The injection driver 74 is used to determine if any dynamic link libraries 78 should be loaded for application related logic associated with a process on the windowed operating system, and to select dynamic link libraries 78 based on injection criteria.

The injection dynamic link library 76 includes multiple injection functions for executing injection logic for modifying a main kernel dynamic link library function in an original kernel dynamic link library to jump to an injection hook function within an injection dynamic link library. The injection functions from the injection dynamic link library are used to execute injection logic prior to executing any other applications related logic in a new process address space created by a windowed operating system. The injection dynamic link library 76 is also used for querying an injection driver from for a list of dynamic link libraries that should be injected into a process on a windowed operating system using injection criteria.

Exemplary embodiments of the present invention were described using any of Windows 95, Windows 98, or Windows NT by Microsoft Corporation of Redmond, Wash. However, the present invention is not limited to windowed operating systems by Microsoft, and other windowed operating systems could also be used.

The methods and system described herein result in specific dynamic link libraries being loaded into specific address spaces for specific processes in windowed operating systems. The dynamic link libraries are loaded prior to the execution of any application related code in a process address space created by a windowed operating system.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

I claim:

1. In a computer with a windowed operating system with a plurality of processes, a method for dynamically injecting injection logic into the windowed operating system, comprising the steps of:

loading an injection application on a windowed operating system, wherein the injection application is used to inject injection logic into processes that run on a windowed operating system, and wherein the injection logic is executed prior to any application software associated with the processes;

loading an injection driver from the injection application, wherein the injection driver includes logic to determine if any dynamic link libraries should be loaded for applications that run on the windowed operating system;

injecting injection logic into new processes created on the windowed operating system, wherein the injection logic queries the injection driver to determine if any dynamic link libraries should be injected into the new process.

2. A computer readable medium having stored therein instructions for causing a central processing unit to execute the method of claim 1.

3. The method of claim 1 wherein the windowed operating system is any of Windows 95, Windows 98 or Windows NT.

4. The method of claim 1 wherein the dynamic link libraries are any of Windows 95, Windows 98, or Windows NT dynamic link libraries.

5. In a computer with a windowed operating system with a plurality of processes, a method for dynamically injecting dynamic link libraries into the windowed operating system, comprising the steps of:

executing injection logic from a process on the windowed operating system, wherein the injection logic was injected into the process with an injection application;

querying an injection driver loaded by the injection application from the injection logic;

determining from the injection driver whether any dynamic link libraries should be injected into a memory space for the process, and if so, loading an injection dynamic link library from the injection driver to inject the dynamic link libraries into the memory space for the process on the windowed operating system.

6. A computer readable medium having stored therein instructions for causing a central processing unit to execute the method of claim 5.

7. The method of claim 5 wherein the windowed operating system is any Windows 95, Windows 98 or Windows NT.

8. In a computer with a windowed operating system with a plurality of processes, a method for dynamically injecting dynamic link libraries into the windowed operating system, comprising the steps of:

querying an injection driver from an injection dynamic link library for a list of dynamic link libraries that should be injected into a process on a windowed operating system;

repeating the following steps from the injection dynamic link library using the list of dynamic link libraries obtained from the injection driver:

determining whether a dynamic link library from the list is appropriate to load into a memory space for the process, and if so, loading the dynamic link library into a memory space for the process; and creating a log entry in an injection log for the dynamic link library.

9. A computer readable medium having stored therein instructions for causing a central processing unit to execute the method of claim 8.

10. The method of claim 8 wherein the windowed operating system is any of Windows 95, Windows 98 or Windows NT.

11. The method of claim 8 wherein the log entry includes any of a dynamic link library loaded, a location for the dynamic link library, a timestamp, or a result returned from loading a dynamic link library.

12. The method of claim 8 further comprising:

determining whether a dynamic link library from the list is appropriate to load into a memory space for the process, and if not, creating a log entry in an injection log for the dynamic link library indicating the dynamic link library was not loaded into the memory space for the process.

13. The method of claim 8 wherein the log entry includes a name of a dynamic link library loaded, a location, a timestamp and a reason for not using the dynamic link library.

14. The method of claim 8 wherein the step of loading the dynamic link library into a memory space for the process includes using a dynamic link library loading function called LoadLibrary from an injection dynamic link library called INJECT.DLL on the windowed operating system.

15. In a computer with a windowed operating system with a plurality of processes, a method for dynamically injecting dynamic link libraries into the windowed operating system, comprising the steps of:

selecting a set of injection criteria for one or more dynamic link libraries from an injection dynamic link library that will be injected into a process on a windowed operating system;

querying an injection driver from the injection dynamic link library for a list of dynamic link libraries that meet the set of injection criteria; and loading dynamic link libraries from the list, if any, into a memory space for the process on the windowed operating system.

16. A computer readable medium having stored therein instructions for causing a central processing unit to execute the method of claim 15.

17. The method of claim 15 wherein the windowed operating system is any of Windows 95, Windows 98 or Windows NT.

18. A system for dynamically injecting dynamic link libraries into processes on a windowed operating system, comprising in combination:

an injection driver for determining if any dynamic link libraries should be loaded for application related logic associated with a process on the windowed operating system, and for dynamically selecting dynamic link libraries using injection criteria; and an injection dynamic link library with a plurality of injection functions for executing injection logic and modifying main kernel dynamic link library function in an original kernel dynamic link library to jump to an injection hook function within an injection dynamic link library, wherein the injection functions from the injection dynamic link library are used to execute injection logic prior to executing any other applications related logic in a new process address space created by a windowed operating system, and for querying an injection driver from for a list of dynamic link librariesthat should be injected into a process on a windowed operating system using injection criteria.

19. The system of claim 18 wherein the windowed operating system is any of Windows 95, Windows 98, or Windows NT.

20. The system of claim 18 wherein the injection dynamic link library is an injection dynamic link library called INJECT.DLL in the windowed operating system.

* * * * *